United States Patent [19]

Kuzma

[11] Patent Number: 5,754,700
[45] Date of Patent: May 19, 1998

[54] METHOD AND APPARATUS FOR IMPROVING THE QUALITY OF IMAGES FOR NON-REAL TIME SENSITIVE APPLICATIONS

[75] Inventor: Andrew J. Kuzma, Portland, Oreg.

[73] Assignee: Intel Corporation, Santa Clara, Calif.

[21] Appl. No.: 489,100

[22] Filed: Jun. 9, 1995

[51] Int. Cl.$^6$ ............... G06K 9/36; H04N 7/12
[52] U.S. Cl. ............... 382/236; 348/420; 348/409
[58] Field of Search .............. 382/236, 239, 382/232; 348/397, 399, 400, 401, 402, 409, 412, 415, 423, 425, 430, 431, 394, 416, 420

[56] References Cited

U.S. PATENT DOCUMENTS

| | | | |
|---|---|---|---|
| Re. 35,414 | 12/1996 | Murakami et al. | 348/409 |
| 5,267,334 | 11/1993 | Mormille et al. | 382/236 |
| 5,311,310 | 5/1994 | Jozawa et al. | 348/416 |
| 5,363,139 | 11/1994 | Keith | 348/415 |
| 5,387,938 | 2/1995 | Fukuda et al. | 348/420 |

*Primary Examiner*—Leo Boudreau
*Assistant Examiner*—Wenpeng Chen
*Attorney, Agent, or Firm*—Blakely, Sokoloff, Taylor & Zafman

[57] ABSTRACT

A method and apparatus for improving the quality of images for non-real time sensitive applications are disclosed. A preprocessing unit receives a first frame from a input line. The preprocessing unit calculates a difference value between the first frame and a previously-received-frame. The preprocessing unit sends the first frame to a buffer unit coupled to the preprocessing unit. The preprocessing unit sends the difference value to a statistics unit coupled to the preprocessing unit. Using the calculated difference value, the statistics unit determines whether the first frame contains a scene change. The statistics unit generates a strategy for encoding the first frame based on the criteria of whether the first frame contains a scene change and whether the first frame is used in a still image or a moving image. A video coder-decoder coupled to the statistics unit and the buffer unit receives the first frame and the strategy for encoding the first frame simultaneously. The video coder-decoder operates to encode the first frame using this strategy.

16 Claims, 7 Drawing Sheets

METHOD AND APPARATUS FOR IMPROVING THE QUALITY OF IMAGES FOR NON-REAL TIME SENSITIVE APPLICATIONS

FIELD OF THE INVENTION

The present invention relates to video encoding. More specifically, the present invention relates to an apparatus and method for improving the quality of images for non-real time sensitive applications.

BACKGROUND OF THE INVENTION

Video distribution from one site to another typically requires a server at a first site to digitize the analog video images to be distributed. These images are then converted into packet format and transmitted to a second site. A client at the second site decodes the packets and processes the data to produce a video image on a screen. A video coder-decoder at the second site processes each frame of the video that is to be displayed. Because digital video requires somewhere between 50 and 200 MB/s (megabits per second) to support the transmission of standard television quality images, data compression is required to meet the bandwidth constraint of computer systems. Two important methods of data compression for video information are widely used throughout the various standards of video image processing. These are the concepts of frame differencing and motion compensation.

Frame differencing recognizes that a normal video sequence has little variation from one frame to the next. Instead of coding each frame, only the differences between a frame and the previous frame are coded. This reduces the amount of information needed to describe the new frame. Typically in video image data, a key frame is marked. The key frame contains information that allows a complete picture to be generated after it is decoded. Following the transmission of a key frame, difference frames are sent. Difference frames contain information on how to change the key frame in order to generate subsequent pictures. Thus, instead of sending key frames during every transmission as in television, the use of difference frames allows the efficient utilization of bandwidth.

Motion compensation recognizes that much of the difference that does occur between successive frames can be characterized as a simple translation of motion caused either by objects moving in the scene or by a pan of the field of view. Rather than form a simple difference between blocks in a current frame and the same block in the previous frame, the area around those blocks is searched in the previous frame to find an offset block that more closely matches the block of the current frame. Once a best match is identified, the difference between a reference block in the current frame and the best match in the previous frame are coded to produce a vector that describes the offset of the best match. This motion vector is used with the previous frame to produce the equivalent of what the current frame should be.

Although these methods of data compression make it possible for computer systems to support various video-based applications, the computer system's bandwidth constraint still limits the quality of images generated by the computer system. For example, in frame differencing and motion compensation, the video coder-decoder must encode the differences between the frames or translate the motion of previous frames within the given bandwidth and latency constraints of the application. When a frame-to-frame image difference is large, the video coder-decoder makes a tradeoff between transmitted image quality and available bandwidth transmission. Typically, the decoded image has easily noticeable artifacts and distortions in these conditions because the necessary information for encoding subsequent frames cannot be transmitted to the video coder-decoder and be processed by the video coder-decoder in time.

Thus, what is needed apparatus and method for improving the quality of images for non-real time sensitive applications. Non-real time sensitive applications are those for which transmission are those for which a transmission delay of ½ second or more is not degrading to the application usefulness. Examples of non-real time sensitive applications are news broadcasts, announcements, etc., where the flow of information is primarily unidirectional.

SUMMARY OF THE INVENTION

A device for video processing is disclosed. One embodiment of the video processor comprises a preprocessing unit. The preprocessing unit receives a frame and generates a difference value for the frame and a previous frame received by the preprocessing unit. A buffer unit is coupled to the preprocessing unit. The buffer unit stores the frame for a predetermined amount of time. The video processor further comprises a statistic unit coupled to the preprocessing unit. The statistic unit determines whether a scene change occurred between the frame and the previous frame. This is achieved by comparing the difference value generated by the preprocessing unit with a predetermined value. The statistic unit also generates a best strategy for encoding the frame. Whether the frame is a still frame or a moving frame determines which strategy is implemented. The video processor further comprises a video coder-decoder unit. The video coder-decoder unit is coupled to the buffer and the statistic unit. The video coder-decoder unit simultaneously receives the frame from the buffer and the strategy from the statistic unit and encodes the frame for display.

A second embodiment of the video processor further comprises a statistics unit which directs the buffer unit to send the previous frame through a first line and to send the frame through a second line simultaneously. This occurs when bandwidth is available to send the frame ahead of time. A first video coder-decoder unit is coupled to the first line for receiving the previous frame from the buffer. The first video coder-decoder generates an encoded previous frame. A second video coder-decoder unit is coupled to the second line for receiving the frame from the buffer. The second video coder-decoder produces an encoded frame. A video multiplexing unit is coupled to the second video coder-decoder for receiving the encoded previous frame and the encoded frame. The video multiplexing unit displays the encoded previous frame before displaying the frame.

BRIEF DESCRIPTION OF THE DRAWINGS

The present invention will be understood more fully from the detailed description given below and the accompanied drawings of the various features and elements embodied in the invention. The description and drawings are not meant to limit the invention to the specific embodiment. They are provided for explanation and understanding.

DETAILED DESCRIPTION

A novel video processing system is described. In the following detailed description, numerous specific details are set forth in order to provide a thorough understanding of the present invention. However, it will be understood by those skilled in the art that the present invention may be practiced without these specific details. In other instances, well-known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is conceived to be a self-consistent sequence of steps leading to a desired result. The steps are those requiring physical manipulations of physical quantities. Usually, though not necessarily, these quantities are electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system or similar electronic computing device that manipulates and transforms data represented as physical (electronic) quantities within the computer system's registers and memories into other data similarly represented as physical quantities within the computer system memories or registers or other such information storage, transmission or display devices.

Figure 1:
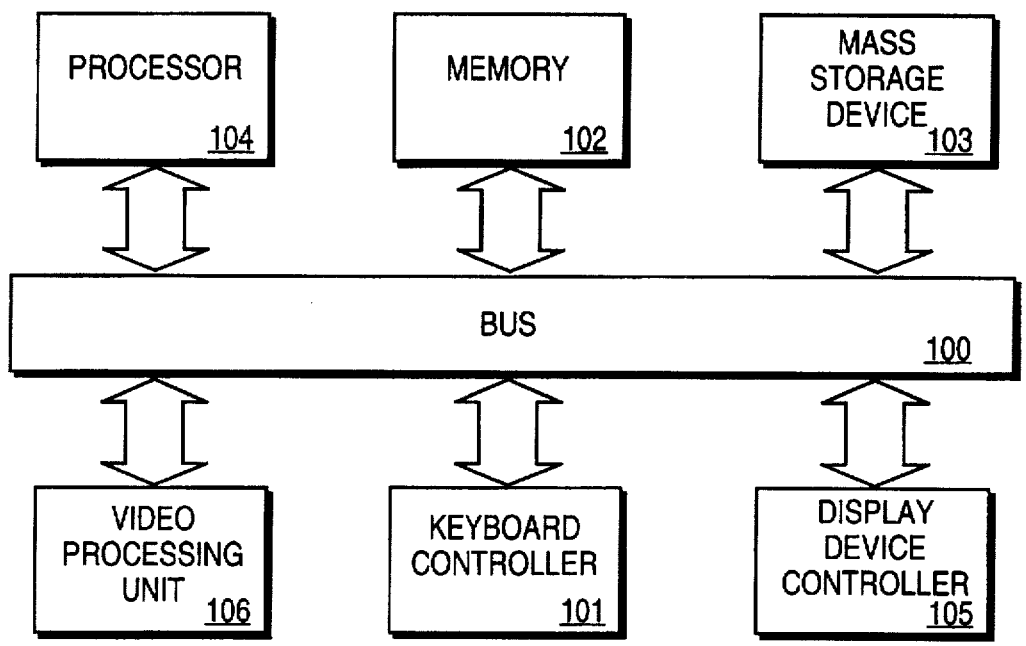
FIG. 1 illustrates one embodiment of the present invention implemented in a computer system.

FIG. 1 illustrates in block diagram form a computer system of one embodiment of the present invention. The computer system comprises bus 100, keyboard interface 101, external memory 102, mass storage device 103, processor 104 and display device controller 105. Bus 100 is coupled to display device controller 105, keyboard interface 101, microprocessor 104, memory 102 and mass storage device 103. Display device controller 105 can be coupled to a display device. Keyboard interface 101 can be coupled to a keyboard.

Bus 100 can be a single bus or a combination of multiple buses. As an example, bus 100 can comprise an Industry Standard Architectural (ISA) bus, an Extended Industry Standard Architecture (EISA) bus, a system bus, a X-bus, PS/2 bus, a Peripheral Components Interconnect (PCI) bus, a Personal Computer Memory Card International Association (PCMCIA) bus or other buses. Bus 100 can also comprise a combination of any buses. Bus 100 provides communication links between components in the computer system. Keyboard interface 101 can be a keyboard controller or other keyboard interface. Keyboard interface 101 can be a dedicated device or can reside in another device such as a bus controller or other controller. Keyboard interface 101 allows coupling of a keyboard to the computer system and transmits signals from a keyboard to the computer system. External memory 102 can comprise a dynamic random access memory (DRAM) device, a static random access memory (SRAM) device, or other memory devices. External memory 102 stores information and data from mass storage device 103 and processor 104 for use by processor 104. Mass storage device 103 can be a hard disk drive, a floppy disk drive, a CD-ROM device, a flash memory device or other mass storage device. Mass storage device 103 provides information and data to external memory 102.

Processor 104 processes information and data from external memory 102 and stores information and data into external memory 102. Processor 104 also receives signals from keyboard controller 101 and transmits information and data to display device controller 105 for display on a display device. Processor 104 also transmits video images to the display controller for display on a display device. Processor 104 can be a complex instruction set computing (CISC) microprocessor, a reduced instruction set computing (RISC) microprocessor, a very long instruction word (VLIW) microprocessor or other processor device. Display device controller 105 allows coupling of a display device to the computer system and acts as an interface between the display device and the computer system. Display device controller 105 can be a monochrome display adapter (MDA) card, a color graphics adapter (CGA) card, enhanced graphics adapter (EGA) card, multi-color graphics array (MCGA) card, video graphics array (VGA) card, extended graphics array (XGA) card or other display device controller. The display device can be a television set, a computer monitor, a flat panel display or other display device. The display device receives information and data from processor 104 through display device controller 105 and displays the information and data to the user of the computer system.

The computer system also comprises video processing unit 106. Video processing unit 106 is coupled to bus 100. Video processing unit can be coupled to a video camera, a video tape player, a video disk player or to an external line for receiving video image data. Video processing unit 106 operates to improve the image quality of frames that are displayed during a scene change when the frame-to-frame image difference between a future frame and a current frame is large. Video processing unit 106 analyzes the status of several frames before they are encoded and sent to display device controller 105 for display. When video processing unit 106 detects a scene change in a future frame, it checks to see whether the current frame requires the maximum bandwidth for sending encoding information to a video coder-decoder in the video processing unit 106. If there is extra bandwidth, the video processing unit 106 utilizes it by sending information about the future frame concurrently with the current frame. By efficiently managing the use of available bandwidth, the video coder-decoder receives critical encoding information for the future frame and is given sufficient time to encode the future frame before the future frame needs to be displayed.

Video processing unit 106 can also generate a strategy for encoding the future frame. Because video processing unit 106 is operable to analyze the status of several frames before they are encoded, video processing unit 106 recognizes if the future frame is to be used in a still image or a moving image. Video processing unit 106 can thus generate a first strategy for encoding the future frame if it is used in a still image and a second strategy for encoding the future frame if it is used in a moving image.

Figure 2:
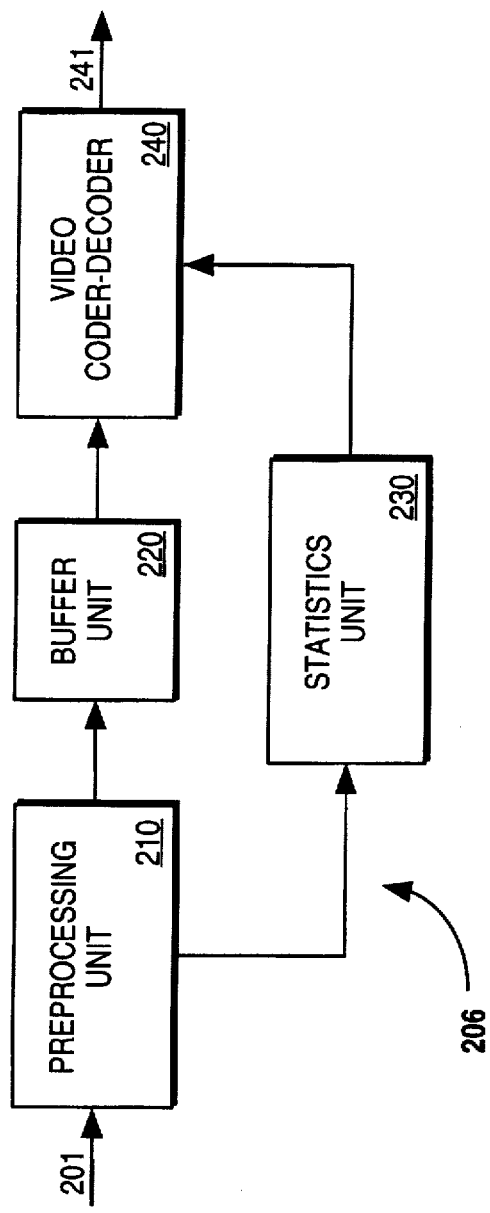
FIG. 2 illustrates a block diagram of one embodiment of the video processing system of the present invention.

FIG. 2 illustrates one embodiment of the video processing unit of the present invention in block diagram form. Video processing unit 206 comprises preprocessing unit 210, buffering unit 220, statistic unit 230, and video coder-decoder 240. Preprocessing unit 210 is coupled to buffer unit 220 and statistic unit 230 and input line 201. Preprocessing unit receives 210 receives video image data from input line 201. The video image data comprises a plurality of frames to be encoded for display. Preprocessing unit 210 receives a first frame and a second frame from input line 201. First frame is to be encoded and displayed before second frame is to be encoded and displayed. First frame may be a key frame or a difference frame. Second frame may be a key frame or a difference frame. Preprocessing unit 210 is operable to compare the second frame with first frame.

In the preferred embodiment of the present invention, preprocessing unit 210 contains a computation unit for calculating the sum of square differences of the first and second frame. The computational unit divides the first frame and the second frame into macroblocks of 16×16 pixels. The computational unit calculates:

$$D_n = \sum_x \sum_y a_{x,y} \sum_u \sum_v (M_{x,y,u,v}F_i - M_{x,y,u,v}F_{i-n})^2$$

In this equation, $D_n$ is the calculated difference value between the second frame, i, and the first frame, i-n. $M_{x,y,u,v}F_i$ represents the pixels at coordinates (u,v) in the macroblock located at coordinates x,y frames i and i-n. $a_{x,y}$ represents the weight assigned to a macroblock for this calculation. The weight of each macroblocks depends on their frame location. For example, the macroblocks located at the center of the frame may be weighted heavier than the macroblocks located at a corner of the frame. The difference value, $D_n$, will be large when many changes need to be made in frame i-n to generate frame i. This can occur when frame i is a new key frame or when i is a difference frame with many changes. The difference value is sent to statistics unit 230 to determine whether a frame contains a scene change.

Statistics unit 230 comprises a difference value comparator and a frame comparator. Statistics unit 230 is coupled to preprocessing unit 210 and video coder-decoder 240. Statistics unit 230 receives difference values from preprocessing unit 210. Difference value comparator compares the difference value to a predetermined value. If the calculated difference value exceeds the predetermined value, the difference value comparator recognizes that the frame contains a scene change. Frame comparator receives the difference values for subsequent frames to said second frame and is operable to determine whether said second frame is used in a still image or a moving image by comparing the difference value of the subsequent frames with a second predetermined value. If the subsequent frames have a difference value less than the second predetermined value, the frame is recognized as being used in a still image. However, if the subsequent frames have a difference value greater than the second predetermined value, the frame is recognized as being used in a moving image. The second predetermined value could be equal to or less than the first predetermined value.

Recognizing whether a frame is being used in a still image or a moving image is important for determining how to encode the frame. Frames in a still image do not need to be displayed as frequently as frames in a moving image. Thus, in order to conserve bandwidth, the rate at which the frames in a still image are transmitted to the video coder-decoder 240 and are encoded by the video coder-encoder 240 may be reduced. The bandwidth may be allocated to improving the resolution of the frames that are encoded by the video coder-decoder 240. Moving images, however, require a higher frame rate to produce a continuous moving picture. Thus, unlike still images, the frame rate of moving images cannot be dropped. Instead, the resolution of the frame can be adjusted in order to conserve bandwidth. A video coder-decoder interface unit in statistics unit 230 generates a strategy to determine when to drop the frame rate of video coder-decoder and when and how to adjust the resolution of frames to be encoded.

Buffer unit 220 is coupled to preprocessing unit 210 and video coder-decoder unit 240. Buffer unit 220 receives the video image data from preprocessing unit 210. Buffer unit 220 stores the video image data for a predetermined period of time. By storing the video image data for a predetermined period of time before sending the data to video coder-decoder 240, buffer unit 220 allows statistics unit 230 to generate a strategy to determine how to most effectively encode the frames in video image data for presentation to a viewer. The present invention realizes that encoding non real-time applications, such as broadcast video, may be delayed for a period of time without adversely affecting the application. Latency in sending the data is not a factor since the delivery is a one-way rather than a two-way exchange, such as in conferencing applications. By buffering the video image data, both the frames to be encoded and a strategy for encoding the frames are made available to the video coder-decoder 240 at the same time.

Video coder-decoder 240 is coupled to buffer unit 220, statistics unit 230 and output line 241. Video coder-decoder comprises a coding unit for encoding a frame for viewers to see. Video coder-decoder 240 further comprises a frame dropping unit, a quantization unit, and a filtering unit for reducing the bandwidth of a frame during a scene change. Video coder-decoder 240 receives frames from buffer 220 and a strategy for encoding the frames from statistics unit 230. The strategy can involve frame dropping, quantization or filtering.

Quantization involves reducing the parameters that may be represented by each pixel. Pixels in a frame are coded with various parameters such as color values and luminance values. The resolution of a picture is related to the number of parameters that may be encoded in each pixel. The more parameters that are encoded in each pixel, the higher resolution the picture will have. In order to reduce the bandwidth requirement, video coder-decoder interface unit may direct quantization unit to quantisize various parameters in a frame. By reducing the number of parameters in each pixel, the number of bits required to encode the frame are reduced, thus reducing bandwidth. The cost of quantization is the reduction in resolution of the encoded frame. For example, pixels in an image that would once be represented as several shades of gray may be represented as either black or white after quantization.

Filtering involves cutting off higher frequencies which contain information that causes the decoder to generate additional information in a frame. There are two types of filtering, temporal filtering and spatial filtering. Temporal filtering treats anomalies in a frame as noise and does not encode them. For example, a temporal filter which sees a pixel encoded black in a first frame, encoded white in a second frame, and encoded back to black in a third frame will treat the pixel in the second frame as noise and encodes the pixel black in all three frames. Spatial filtering ignores details in a frame which require a large amount of bandwidth to describe and does not encode them. For example, a spatial filtering which sees a striped object may encode that object as being only one color. Both temporal and spatial filtering help reduce the bandwidth requirement. In order to reduce bandwidth, video coder-decoder interface unit may direct filtering unit to filter out higher frequencies in a frame.

The following is an example illustrating how video processing unit 206 operates. Preprocessing unit 210 receives frames 1–5 from input line 201. The computational unit in preprocessing unit 210 calculates a difference value between frames 1 and 2, frames 2 and 3, frames 3 and 4, and frames 4 and 5. Frames 1–5 are sent to buffer 220 and the calculated difference values are sent to statistics unit 230. Difference value comparator in statistics unit 230 compares the difference values of frames 1 and 2, frames 2 and 3, frames 3 and 4, and frames 4 and 5 to a predetermined value. Difference value comparator recognizes that since the difference value of frames 1 and 2 is greater than a predetermined value, a scene change occurs in frame 2. Difference value comparator also recognizes that since the difference values of frames 2 and 3, frames 3 and 4, and frames 4 and 5 are less than the first predetermined value, there is no scene change in frames 3, 4, and 5. Frame comparator unit compares the difference values of frames 2 and 3, frames 3 and 4, and frames 4 and 5 to a second predetermined value. Frame comparator unit recognizes that when the difference values for frames 2 and 3, frames 3 and 4, and frames 4 and 5 are less than the second predetermined value frames 3, 4, and 5 are used for a still image. Difference value comparator sends this information to video coder-decoder interface unit to generate a strategy for encoding frames 1 through 5.

Video coder-decoder interface unit instructs video coder-decoder 240 to encode frame 1 at the normal frame rate using high resolution. However, since frame 2 is a scene change to a still image, video coder-decoder interface unit instructs video coder-decoder 240 to drop the frame rate for frames 2–5 and to utilize the available bandwidth to generate a picture with high resolution.

In another example, preprocessing unit 210 receives frames 6–10 from input line 201. The computational unit in preprocessing unit 210 calculates a difference value between frames 6 and 7, frames 7 and 8, frames 8 and 9, and frames 9 and 510. Frames 6–10 are sent to buffer 220 and the calculated difference values are sent to statistics unit 230. Difference value comparator in statistics unit 230 compares the difference values of frames 6 and 7, frames 7 and 8, frames 8 and 9, and frames 9 and 10 to a predetermined value. Difference value comparator recognizes that since the difference value of frames 6 and 7 is greater than the predetermined value, a scene change occurs in frame 7. Difference value comparator also recognizes that since the difference values of frames 7 and 8, frames 8 and 9, and frames 9 and 10 are less than the first predetermined value, there is no scene change in frames 8,9, and 10. Frame comparator unit recognizes that when the difference values for these frames are greater than the second predetermined value that frames 8,9, and 10 are used for a moving image. Difference value comparator sends this information to video coder-decoder interface unit to generate a strategy for encoding frames 6 through 10.

Video coder-decoder interface unit instructs video coder-decoder 240 to encode frame 6 at the normal frame rate using high resolution. However since frame 7 is a scene change to a moving image, video coder-decoder interface unit instructs video coder-decoder 240 to maintain the same frame rate but to drop the resolution of each frame to reduce the bandwidth by using low quantization and by filtering out high frequencies in these frames.

Figure 3:
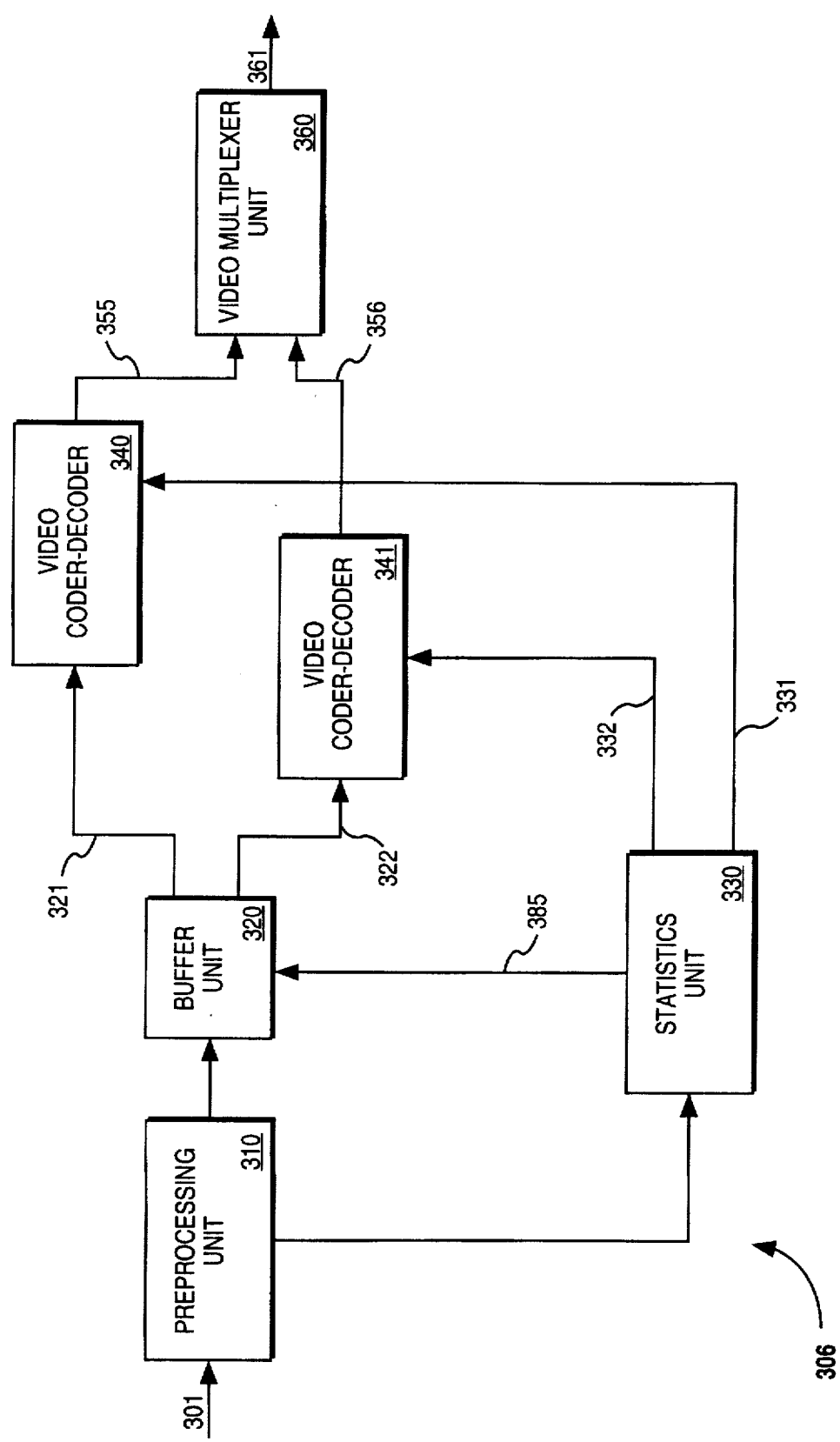
FIG. 3 illustrates a block diagram of a second embodiment of the video processing system of the present invention.

FIG. 3 illustrates a second embodiment of the video processing unit of the present invention. Video processing unit 306 comprises preprocessing unit 310, buffer unit 320, statistics unit 330, video coder-decoder unit 340, video coder-decoder unit 341, and video multiplexer unit 360. Preprocessing unit 310 operates similarly to the preprocessing unit 210 illustrated in FIG. 2. Preprocessing unit is coupled to buffer unit 320 and statistics unit 330.

Buffer unit 320 is coupled to preprocessing unit 310, statistics unit 330, video coder-decoder 340, and video coder-decoder 341. Buffer unit 320 receives video image data from preprocessing unit 310 and stores the video image data for a predetermined amount of time. Buffer unit 320 can selectively send video image data to either video coder-decoder 340 through line 321 or video coder-decoder 341 through line 322 or to both video coder-decoder 340 and video coder-decoder 341 in parallel. Buffer unit 320 receives instructions through line 335 from statistics unit 330 as to how long certain video image data is to be stored and to which video coder-decoder they are to be sent.

Statistics unit 330 is coupled to preprocessing unit 310, buffer unit 320, video coder-decoder 340, and video coder-decoder 341. Statistics unit 330 comprises a difference value comparator similar to that described in statistics unit 230 illustrated in FIG. 2. The difference value comparator in statistics unit 330 is operable to compare the difference value of frames to a predetermined number and determine whether a frame contains a scene change. Statistics unit 330 further comprises a frame comparator similar to that described in statistics unit 230. The frame comparator in statistics unit 330 is operable to compare the difference value of frames to a second predetermined number to determine whether a frame is used in a still image or a moving image.

Statistics unit 330 further comprises a frame forwarding unit. When difference value comparator detects a scene change in a future frame, frame forwarding unit operates to determine whether the current frame requires the maximum bandwidth for sending encoding information to a first video coder-decoder. If there is bandwidth available, frame forwarding unit instructs buffer unit 320 to forward encoding information of the future frame to a second video coder-decoder in parallel for encoding the future frame. By sending encoding information about the future frame ahead of time, frame forwarding unit utilizes the available bandwidth in the present and allows immediate processing of the future frame so that the image quality of the future frame will be improved. In one embodiment, frame forwarding unit determines whether there is available bandwidth to forward encoding information of a future frame by checking the amount of encoded information that is required to be forwarded for the current frame. This is achieved by comparing the difference value of the current frame with a third predetermined value.

Statistics unit 330 further comprising a video coder-decoder interface unit. Video coder-decoder interface unit receives information regarding whether there is a scene change in a frame from the difference value comparator, whether the frame is being used in a still image or a moving image from the frame comparator, and whether encoding information from the frame is being forwarded ahead of time to a second video coder-decoder from frame forwarding unit. Video coder-decoder interface unit uses this information to generates a strategy to determine when to drop the frame rate of a specific video coder-decoder and how to adjust the resolution of frames encoded.

Video processing unit 306 further comprises video coder-decoder 340 and video coder-decoder 341. Video coder-decoder 340 is coupled to buffer unit 320, statistics unit 330 and video multiplexer unit 360. Video coder-decoder 341 is coupled to buffer unit 320, statistics unit 330, and video multiplexer unit 360. Video coder-decoder 340 and video coder-decoder 341 operate similarly to the video coder-decoder 240 described in FIG. 2. Video coder-decoders 340 and 341 comprise an encoding unit for encoding frames for viewers to see. Video coder-decoders 340 and 341 further comprise frame dropping units, quantization units, and filtering units for reducing the bandwidth of frames during scene changes.

Video multiplexer unit 360 is coupled to video coder-decoder 340 and video coder-decoder 341. Video multiplexer unit 360 operates to mix the data streams received from line 355 from video coder-decoder 340 and the data stream received from line 356 from video coder-decoder 341 in order to generate one continuous data stream.

The following is an example illustrating how video processing unit 306 operates. Preprocessing unit 310 receives frames 1–5 from input line 301. The computational unit in preprocessing unit 310 calculates a difference value between frames 1 and 2, frames 2 and 3, frames 3 and 4, and frames 4 and 5. Frames 1–5 are sent to buffer 320 and the calculated difference values are sent to statistics unit 330. Difference value comparator in statistics unit 330 compares the difference values of frames 1 and 2, frames 2 and 3, frames 3 and 4, and frames 4 and 5 to a predetermined value. Difference value comparator recognizes that since the difference value of frames 3 and 4 is greater than a predetermined value, a scene change is in frame 4. Difference value comparator also recognizes that when the difference values of frames 1 and 2, frames 2 and 3, and frames 4 and 5 are less than the first predetermined value, there is no scene change in frames 2, 3, and 5. Frame comparator unit compares the difference values of frames 4 and 5 to a second predetermined value. Frame comparator unit recognizes that when the difference values for frames 4 and 5 is less than the second predetermined value, frame 5 is used for a still image. Frame forwarding unit compares the difference values for frames 1 and 2 and frames 2 and 3 to a third predetermined value. Frame forwarding unit recognizes that since the difference for frames 1 and 2 and frames 2 and 3 are less than a third predetermined value, frames 2 and 3 does not require utilizing the maximum bandwidth for sending encoding information to a video coder-decoder.

Frame forwarding unit instructs buffer unit 320 to send encoding information of frames 1–3 through line 321 to video coder-decoder 340. Frame forwarding unit instructs buffer unit 320 to send encoding information of frames 4–5 through line 322 to video coder-decoder 341. Video coder-decoder interface unit sends instructions through line 332 to drop the frame rate of video coder-decoder 341 and to utilize the available bandwidth to produce a high resolution picture. Encoded frames 1–3 are sent through line 355 to video multiplexer unit 360 and encoded frames 4 and 5 are sent through line 356 to video multiplexer unit 360. Video multiplexer unit 360 receives the encoded frames and orders the frames for output through line 361.

In another example, preprocessing unit 310 receives frames 6–10 from input line 301. The computational unit in preprocessing unit 310 calculates a difference value between frames 6 and 7, frames 7 and 8, frames 8 and 9, and frames 9 and 10. Frames 6–10 are sent to buffer 320 and the calculated difference values are sent to statistics unit 330. Difference value comparator in statistics unit 330 compares the difference values of frames 6 and 7, frames 7 and 8, frames 8 and 9, and frames 9 and 10 to a first predetermined value. Difference value comparator recognizes that since the difference value of frames 8 and 9 is greater than a predetermined value, a scene change is in frame 9. Difference value comparator also recognizes that when the difference values of frames 6 and 7, frames 7 and 8, and frames 9 and 10 are less than the first predetermined value, there is no scene change in frames 7, 8, and 10. Frame comparator unit compares the difference values of frames 9 and 10 to a second predetermined value. Frame comparator unit recognizes that since frames 9 and 10 are less than the second predetermined value, frames 10 is used for a still image. Frame forwarding unit compares the difference values for frames 6 and 7 and frames 7 and 8 to a third predetermined value. Frame forwarding unit recognizes that when the difference for frames 6 and 7 and frames 7 and 8 are greater than a third predetermined value, frames 7 and 8 requires utilizing a large amount of bandwidth for sending encoding information to a video coder-decoder and that bandwidth for sending encoding information for frame 9 ahead of time is not available.

Frame forwarding unit instructs buffer unit 320 to send encoding information of frames 6–10 through line 321 to video coder-decoder 340. Video coder-decoder interface unit sends instructions through line 331 to video coder-decoder 340 to encode frames 6–8 at the normal frame rate using high resolution. For frames 9 and 10, video coder-decoder interface unit sends instructions through line 331 for video coder-decoder 340 to drop its frame rate and to utilize the available bandwidth to produce a high resolution picture for the scene change. Encoded frames 6–10 are sent through line 355 to video multiplexer unit 360. Video multiplexer unit 360 receives the encoded frames and puts it out on line 361.

Figure 4:
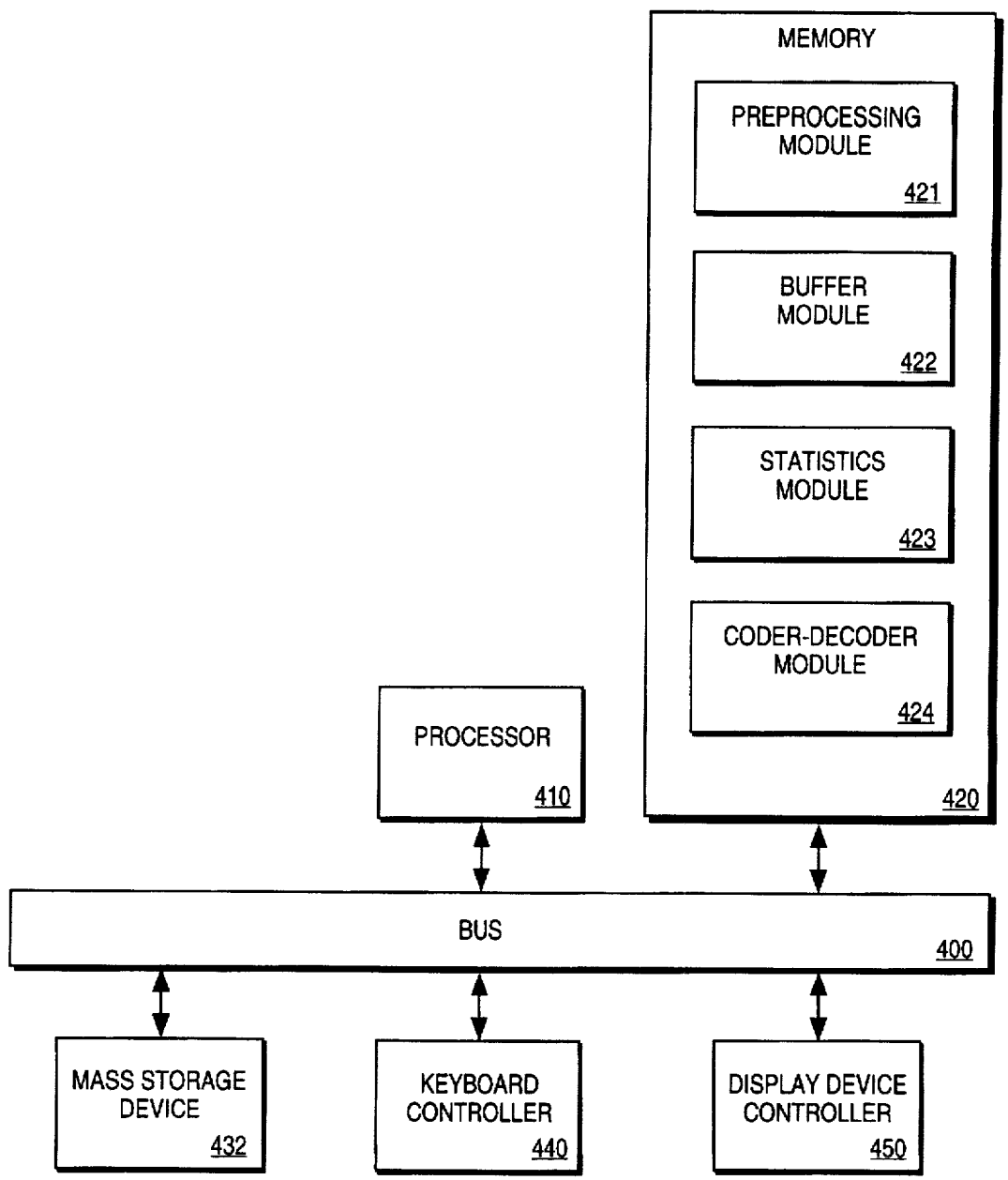
FIG. 4 illustrates a block diagram of a third embodiment of the video processing system of the present invention.

FIG. 4 illustrates in block diagram form a typical computer system of a fourth embodiment of the present invention. Computer system 400 comprises bus 400, microprocessor 410, memory 420, data storage device 430, keyboard controller 440, and display device controller 450.

Microprocessor 410 can be a complex instruction set computing (CISC) microprocessor, a reduced instruction set computing (RISC) microprocessor or other processor device. Microprocessor executes instructions or code stored in memory 420 and performs operations on data stored in memory 420. Computer system 400 further comprises a data storage device 430 such as a hard, floppy, or optical disk drive which is coupled to bus 415. Display device controller 450 is also coupled to bus 415. Display device controller 450 allows coupling of a display device to the computer system. Keyboard controller 440, allows coupling of a keyboard to the computer system and transmits signals from a keyboard to the computer system.

Memory 420 is coupled to the microprocessor 410 through bus 400. Memory 420 can be a dynamic random access memory (DRAM), static random access memory (SRAM) or other memory device. Memory 420 can store instruction or code executable by processor 410 that are part of application programs, operating system programs or other computer programs. Memory 420 comprises preprocessing module 421, buffer module 422, statistics module 423, and coder-decoder module 424. Preprocessing module 421 comprises a first plurality of processor executable instructions that are executed by processor 410 in the manner shown in FIG. 6. Preprocessing module performs functions similar to that of preprocessing module 210 in FIG. 2. Buffer module 422 comprises a second plurality of processor executable instructions that are executed by processor 410 in the manner shown in FIG. 6. Buffer module performs functions similar to that of buffer unit 220 in FIG. 2. Statistics module 423 comprises a third plurality of processor executable instructions that are executed by processor 410 in the manner shown in FIG. 6. Statistics module performs functions similar to that of statistics unit 230 in FIG. 2. Video coder-decoder module 424 comprises a fourth plurality of processor executable instructions that are executed by processor 410 in the manner shown in FIG. 6. Video coder-decoder module functions similar to the video coder-decoder unit 240 in FIG. 2.

Figure 5:
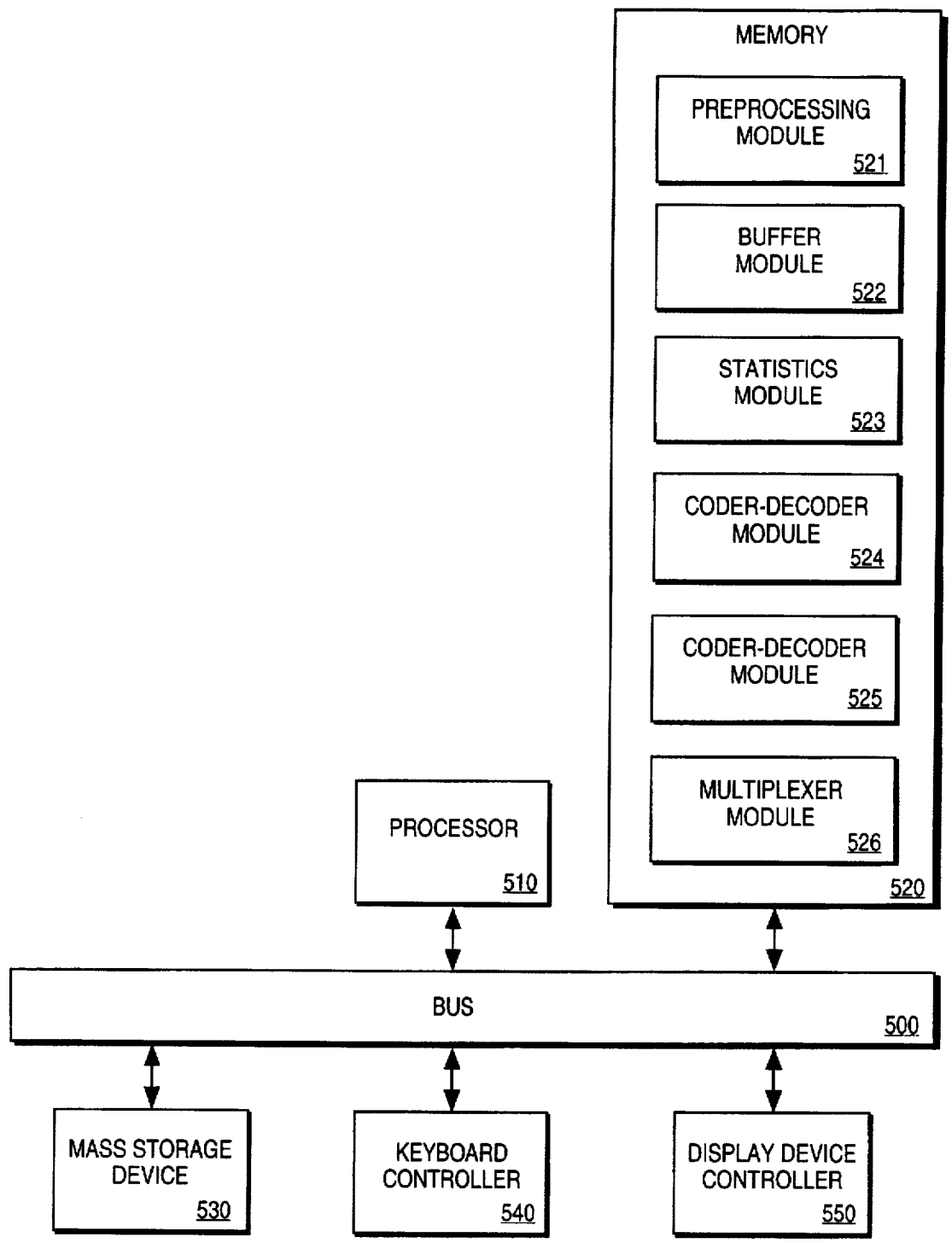
FIG. 5 illustrates a block diagram of a fourth embodiment of the video processing system of the present invention.

In another embodiment of the present invention illustrated in FIG. 5, memory 520 comprises preprocessing module 521, buffer module 522, statistics module 523, and video coder-decoder module 424, video coder-decoder module 525, and multiplexer module 526. Preprocessing module 521 comprises a first plurality of processor executable instructions executed by processor 410 in the manner shown in FIG. 7. Preprocessing module 521 functions similar to the preprocessing module 310 in FIG. 3. Buffer module 522 comprises a second plurality of processor executable instructions executed by processor 410 in the manner shown in FIG. 7. Buffer module 522 functions similar to the buffer unit 320 in FIG. 3. Statistics module 523 comprises a third plurality of processor executable instructions executed by processor 410 in the manner shown in FIG. 7. Statistics module 523 functions similar to the statistics unit 330 in FIG. 3. Video coder-decoder module 524 comprises a fourth plurality of processor executable instructions executed by processor 410 in the manner shown in FIG. 7. Video coder-decoder module 524 functions similar to the video coder-decoder unit 340 in FIG. 3. Video coder-decoder module 525 comprises a fifth plurality of processor executable instructions executed by processor 410 in the manner shown in FIG. 7. Video coder-decoder module 525 functions similar to the video coder-decoder unit 341 in FIG. 3. Multiplexer module 526 comprises a sixth plurality of processor executable instructions executed by processor 410. Multiplexer module 526 functions similar to the multiplexer unit 360 in FIG. 3.

Figure 6:
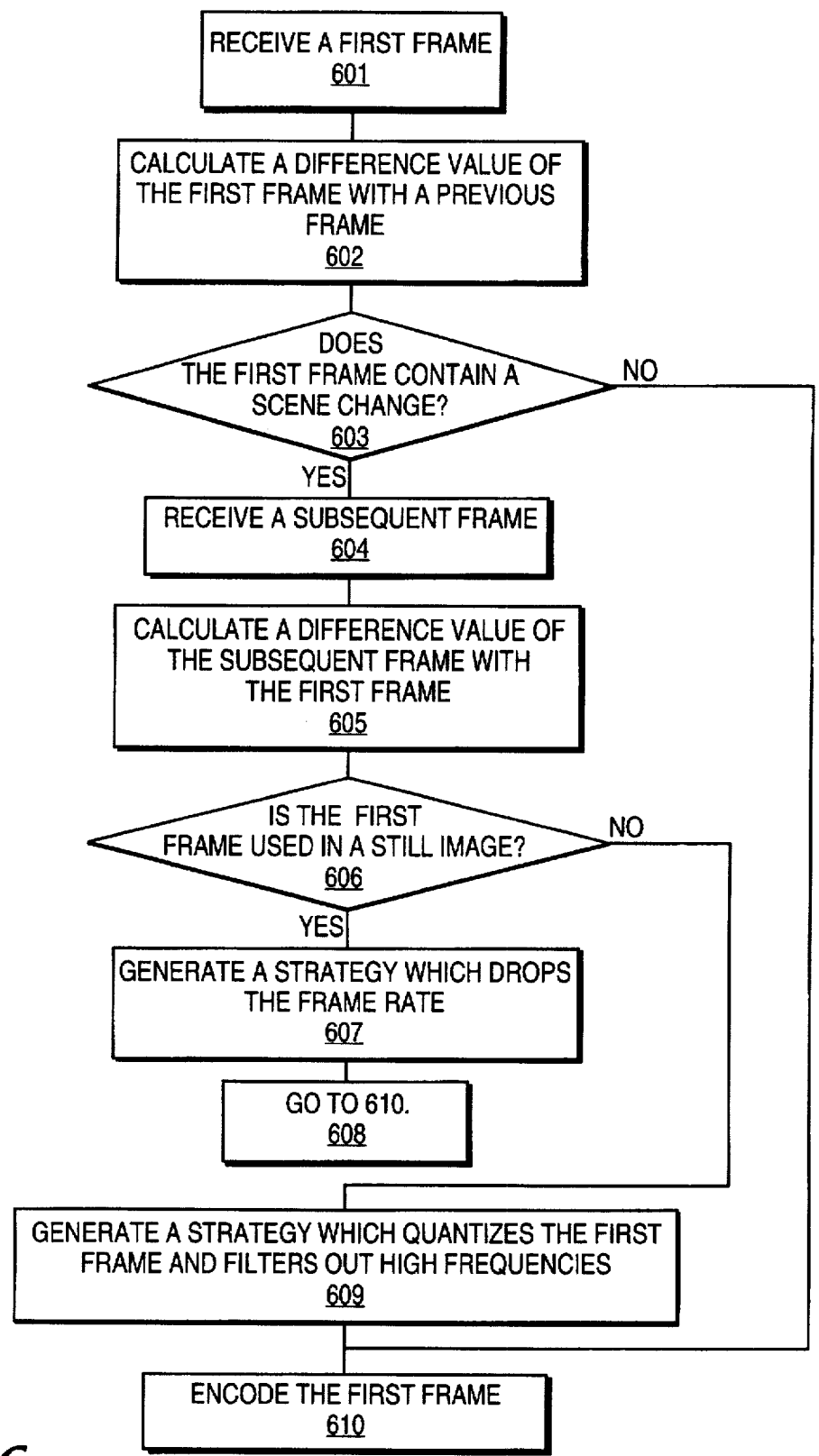
FIG. 6 is a flow chart illustrating a first method for processing video data.

FIG. 6 illustrates in flow diagram form a method according to one embodiment of the present invention. First, receive a first frame as shown in block 601. The first frame can be received for example by a preprocessing unit from a video camera, video tape player, video disk player or other source. Next, compare the first frame to a previous frame received and calculate a difference value as shown in block 602. The previous frame may be, for example, the frame before the first frame or other designated frames received before the first frame. The first frame and previous frame can be compared using a variety of different methods. For example, the sum of square differences for macroblocks of the first frame and the previous frame can be calculated. After the first frame and the previous frame have been compared and a difference value is calculated, use the difference value to determine if the first frame contains a scene change. This is shown in block 603. Typically in a scene change, many of the macroblocks in a frame are different from the macroblocks in a previous frame. Thus, by comparing the difference value to a first predetermined number representing a scene change threshold, one can determine whether a scene change occurs if the difference value is greater than the first predetermined number. The comparison can be made in a statistics unit. If the first frame contains a scene change, go to block 604. If the first frame does not contain a scene change, go to block 610.

Block 604 instructs the routine to receive a subsequent frame. The subsequent frame may be received in the same manner as the first frame was received. Next, compare the subsequent frame with the first frame and calculate a difference value. This is illustrated in block 605. The comparison can be made similar to the manner illustrated in block 602. After the difference value is calculated, determine whether the first frame is used as a still image or a moving image. Normally in a still image, the macroblocks in subsequent frames are changed minimally. However, in moving images, many of the macroblocks in subsequent frames are changed. Thus, by comparing the difference values of a subsequent frame or several subsequent frames to a second predetermined number, one can determine whether the first frame is used in a still image or a moving image. The comparison can be made in a statistics unit. This is illustrated in block 606.

A strategy for encoding the first frame is generated using the information regarding whether the first frame contains a scene change and whether the first frame is used for a still image or a moving image. The strategy would describe the best way to encode the first frame given the bandwidth constraints of the computer system and the nature of the image. If the first frame is used in a still image go to block 607. If the first frame is not used in a still image go to block 609. Block 607 instructs the routine to generate a strategy which drops the frame rate. Block 608 instructs the routine to go to block 610. Block 609 instructs the routine to generate a strategy which quantisizes the first frame and filters out high frequencies in the first frame. Block 610 instructs the routine to use the strategy generated to encode the first frame. The encoding can be achieved by using a coder-decoder unit. In another embodiment of the present invention, a strategy for encoding the first frame is generated to reduce bandwidth and to improve image quality regardless of whether or not the first frame contains a scene change.

Figure 7:
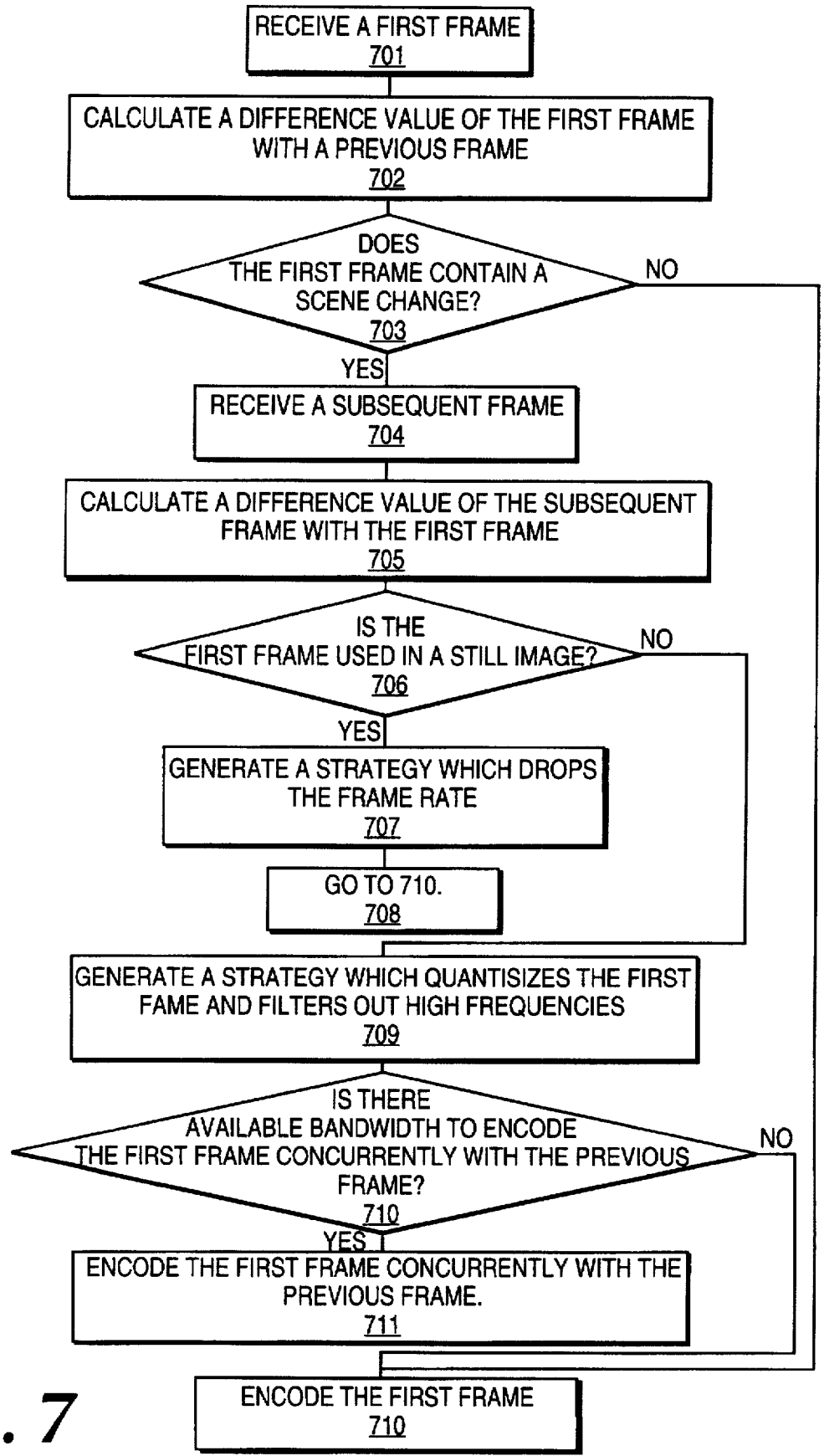
FIG. 7 is a flow chart illustrating a second method for processing video data.

FIG. 7 illustrates in flow diagram form a second method according to one embodiment of the present invention. First, receive a first frame as shown in block 701. The first frame can be received for example by a preprocessing unit from a video camera, video tape player, video disk player or other source. Next, compare the first frame to a previous frame received and calculate a difference value as shown in block 702. The previous frame may be, for example, the frame before the first frame or other designated frames received before the first frame. After the first frame and the previous frame have been compared and a difference value is calculated, use the difference value to determine if the first frame contains a scene change. This is shown in block 703. If the first frame contains a scene change, go to block 704. If the first frame does not contain a scene change, go to block 712.

Block 704 instructs the routine to receive a subsequent frame. The subsequent frame may be received in the same manner the first frame was received. Next, compare the subsequent frame with the first frame and calculate a difference value. This is illustrated in block 705. The comparison can be made similar to the manner illustrated in block 702. After the difference value is calculated, determine whether the first frame is used as a still image or a moving image. This is illustrated in block 706. If the first frame is used in a still image, go to block 707. If the first frame is used in a moving image, go to block 709.

A strategy for encoding the first frame is generated using the information regarding whether the first frame contains a scene change and whether the first is used for a still image or a moving image. The strategy would describe the best way to encode the first frame given the bandwidth constraints of the computer system and the nature of the image. If the first frame is used in a still image, go to block 707. If the first frame is not used in a still image, go to block 709. Block 707 instructs the routine to generate a strategy that drops the frame rate. Block 708 instructs the routine to go to block 710. Block 709 instructs the routine to generate a strategy which quantisizes the first frame and filters out high frequencies in the first frame.

Block 710 instructs the routine to determine whether there is available bandwidth to encode the first frame concurrently with the previous frame. Typically, the difference value of the previous frame and a frame received before the previous frame has to be calculated to determine whether the previous frame requires the use of all the bandwidth available to be encoded. If there is available bandwidth, the first frame may be encoded concurrently with the previous frame using the strategy generated. This is shown in block 711. If there is not available bandwidth to concurrently encode the first frame with the previous frame, the first frame must wait until the previous frame is encoded before it can be encoded using the strategy generated. Block 712 instructs the routine to encode the first frame using generated strategy if available. In another embodiment of the present invention, a strategy for encoding the first frame is generated to reduce bandwidth and to improve image quality regardless of whether or not the first frame contains a scene change.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be limiting. Therefore, references to details of particular embodiments are not intended to limit the scope of the claims, which in themselves recite to these features regarded as essential to the invention.

What is claimed is:

1. A video processor, comprising:
   a) a preprocessing unit that calculates a difference value for a frame and a subsequent frame;
   b) a statistic unit, coupled to the preprocessing unit, having
      i) a frame comparator unit that determines that the frame is a still frame when the difference value is below a predetermined value and that the frame is a moving frame when the difference value is above the predetermined value, and
      ii) a video coder-decoder interface, coupled to the frame comparator unit, that generates a first strategy for encoding the frame when the frame is a still frame and a second strategy when the frame is a moving frame; and
   c) a video coder-decoder unit, coupled to the statistic unit, having a frame rate adjuster that drops a frame rate for encoding the frame when the first strategy is received from the statistic unit.

2. The video processor of 1, wherein the video coder-decoder unit comprises a filtering unit that filters out high frequencies from the frame when the second strategy is received from the statistic unit.

3. The video processor of claim 1, wherein the video coder-decoder unit comprises a quantisizer unit that quantisizes the frame when the second strategy is received from the statistic unit.

4. A video processor comprising:
   a preprocessing unit that generates a first difference value for a frame and a previous frame and a second difference value for the frame and a subsequent frame;
   a statistic unit, coupled to said preprocessor, that directs the previous frame to a first line and the frame to a second line simultaneously when the first difference value is within a predetermined range and that generates a strategy for encoding the frame based on the second difference value;
   a first video coder-decoder unit, coupled to the first line that encodes the previous frame;
   a second video coder-decoder unit, coupled to the second line that encodes the frame according to the strategy;
   a video multiplexing unit, coupled to the first video coder-decoder unit and the second video coder-decoder unit, that multiplexes an encoded previous frame with an encoded frame to be transmitted together.

5. The video processor of claim 4, wherein the preprocessing unit comprises a computational unit that calculates a sum of square differences of the frame and the previous frame as the first difference value.

6. The video processor of claim 5, wherein the statistic unit comprises a video coder-decoder interface unit that generates a first strategy when the second difference value is less than a second predetermined value and that generates a second strategy when the second difference value is greater than the second predetermined value.

7. The video processor of claim 6, wherein the second video coder-decoder unit comprises a frame rate adjuster that drops the frame rate of the second video coder-decoder when the first strategy is received from the statistic unit.

8. The video processor of claim 6, wherein the second video coder-decoder unit comprises a filtering unit that filters out high frequencies from the frame when the second strategy is received from the statistic unit.

9. The video processor of claim 6, wherein the second video coder-decoder unit comprises a quantisizer unit that quantisizes the frame when the second strategy is received from the statistic unit.

10. A method for encoding data, comprising:
    comparing a frame with a subsequent frame and determining whether the frame is to be used in a still image or a moving image;
    generating a first strategy for encoding the frame when the frame is to be used in the still image and a second strategy for encoding the frame when the frame is to be used in the moving image; and
    dropping the frame rate for encoding the frame for display when the first strategy is generated.

11. The method of claim 10, wherein comparing the frame with the subsequent frame comprises calculating a sum of square difference value of said frame and the subsequent frame.

12. The method of claim 11, wherein determining whether said frame is to be used in the still image or the moving image comprises comparing the sum of square difference value with a predetermined threshold value.

13. A method for encoding data, comprising:
    generating a difference value for a frame and a previous frame;

directing the previous frame to a first video coder-decoder and directing the frame to a second video coder-decoder simultaneously when the difference value is within a predetermined range;

encoding the previous frame and encoding the frame simultaneously;

multiplexing the previous frame and the frame to be transmitted together.

14. The video processor of claim 1, wherein the preprocessing unit comprises a computational unit that calculates a sum of square differences between the frame and the subsequent frame as the difference value.

15. The method of claim 10, further comprising filtering out high frequencies from the frame when the second strategy is generated.

16. The method of claim 10, further comprising quantisizing the frame when the second strategy is generated.

* * * * *